(12) United States Patent
Sekiguchi

(10) Patent No.: US 6,288,799 B1
(45) Date of Patent: Sep. 11, 2001

(54) IMAGE COMMUNICATING APPARATUS

(75) Inventor: Kiyonori Sekiguchi, Tokyo (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 08/755,364

(22) Filed: Nov. 25, 1996

(30) Foreign Application Priority Data

Dec. 14, 1995 (JP) .................................................... 7-325429

(51) Int. Cl.⁷ ...................................................... H04N 1/00
(52) U.S. Cl. ..................................... 358/468; 379/100.01
(58) Field of Search .................................... 358/400, 474, 358/468, 261.1, 261.2, 261.3, 261.4, 426, 427, 405, 432, 434, 435, 436, 438, 404, 444, 442; 379/100.01, 100.09, 100.15, 100.11; 382/232, 246, 312, 317

(56) References Cited

U.S. PATENT DOCUMENTS

| | | | |
|---|---|---|---|
| 5,224,180 | * 6/1993 | Tadokoro | 382/317 |
| 5,384,835 | * 1/1995 | Wheeler et al. | 379/100.1 |
| 5,712,907 | * 1/1998 | Wegner | 379/112 |
| 5,715,453 | * 2/1998 | Stewart | 395/615 |
| 5,953,392 | * 9/1999 | Rhie | 379/88.13 |

FOREIGN PATENT DOCUMENTS

| | | | |
|---|---|---|---|
| 4-265040 | 9/1992 | (JP) . | |
| 05153309A | * 6/1993 | (JP) | H04N/1/00 |
| 5-284326 | 10/1993 | (JP) . | |
| 5-308503 | 11/1993 | (JP) . | |
| 7-143309 | 6/1995 | (JP) . | |
| 6-288668 | 10/1995 | (JP) | H04N/1/32 |
| 11068825A | * 3/1999 | (JP) | H04L/12/54 |

\* cited by examiner

Primary Examiner—Jerome Grant, II
(74) Attorney, Agent, or Firm—Connolly Bove Lodge & Hutz

(57) ABSTRACT

An image communicating apparatus having an image reading device for reading an original document to obtain image data. An image storage stores the image data, and an image recording device prints out the image data stored in the image storage. A communication controlling device controls transmission of the data, and a description form generating device generates a data description form which can be communicated on the Internet. The data description form generated by the description form generating device is related to the image data stored in the image storage to output the data to the Internet, thereby readily connecting to the Internet and largely increasing a range of communication destinations.

25 Claims, 10 Drawing Sheets

IMAGE COMMUNICATING APPARATUS

BACKGROUND OF THE INVENTION (1) Field of the Invention

The present invention relates to an image communicating apparatus and, more particularly, to an image communicating apparatus which can transmit image data to communication destinations over the Internet.

(2) Description of Related Art

Utilization of various image communicating apparatus such as facsimiles and the like is significantly spreading in recent years. The facsimile is an apparatus which scans an original to read image data, compresses [in MH (Modified Huffman Coding)/MR (Modified Relative element address designate coding)/MMR (Modified Modified Relative element address designate coding)] the image data, outputs the data by virtue of a coding/decoding apparatus (a modem) and a line controlling (network controlling) apparatus over a telephone line to communicate a destination of communication. When a received signal is expanded, the data of the image is expanded by the coding/decoding apparatus, then the image becomes visible by a function of a recording unit.

On the other hand, the Internet has been rapidly spreading for years. This rapid spread of the Internet arises a subject of affinity between the facsimile apparatus and the Internet since use of the facsimile apparatus is generalized. For this, it is desirable that the facsimile apparatus can be easily connected to the Internet.

However, the present situation is that there has been found no connection in a data format or the like between the Internet and facsimile apparatus because the data description (HTML: Hyper Text Markup Language) in WWW (World Wide Web) in the Internet is a plain text which is quite different from bit information of a facsimile apparatus. Further, HTTP (Hyper Text Transfer Protocol) is used as an upper communication protocol, while TCP (Transmission Control Protocol)/IP (Internet Protocol) is used as a lower communication protocol in WWW of Internet. In order to connect the facsimile apparatus to the Internet, it is necessary to incorporate a retailed software such as Mosaic, Netscape or the like as a browser software in the facsimile apparatus. Actually, incorporation of such a software in the facsimile apparatus is difficult in the light of the price and the like. If the demand to connect the facsimile apparatus to the Internet is discussed including an OS (Operating System), it is necessary to step into the field of personal computers rather than the facsimile apparatus.

In the light of the above problem, an object of the present invention is to provide an image communicating apparatus having a simple structure, which can convert or process image data read out by an image reading means into information which can be treated in a higher degree in the Internet, besides being able to transmit the processed image ata to a terminal apparatus used to process data connected to Internet, and a communicating system using the above mage communicating apparatus.

SUMMARY OF THE INVENTION

The present invention therefore provides an image communicating apparatus comprising an image reading means for reading an original, document. A data inputting means inputs various direction data, and an image storage stores received image data and image data that should be transmitted. An image recording means prints out the image data stored in the image storage and a communication controlling means controls an operation to transmit and receive data over a communication line. A description form generating means generats a data description configuration which can be treated in the Internet, and an outputting means relates the data description form generated by the description form generating means to the image data stored in the image storage to output them to the Internet.

According to this invention, the image communicating apparatus with the above arrangement is connected to a terminal apparatus used to process data which operates to connect to the Internet, so as to the send image data to Internet only by transferring the image data to the terminal apparatus. If a facsimile apparatus is used as the image communicating apparatus to accomplish the above function, it is sufficient that the facsimile apparatus meets Class F standard (there are a format rule and the like of G3 facsimiles). As the terminal apparatus, a personal computer or a work station is used. In the system, bidirectional parallel peripheral interfaces are used when data is outputted from the image communicating apparatus to the terminal apparatus or data is inputted to image communicating apparatus from the terminal apparatus. The image communicating apparatus is provided with standard R232-C interfaces along with the bidirectional parallel peripheral interfaces. The terminal apparatus may optionally include a LAN connecting unit connectable to a network as an option so as to transfer data to the terminal apparatus over the network. To accomplish this optional function, there are required a physical board and a communication protocol/application software necessary in the network.

In the image communicating apparatus with the above arrangement of this invention, the description form generating means converts data (image data) of the facsimile into a data description (HTML) adaptable to the Internet which has different data description, communication protocol and address form, or adds the data description to the data (image data) upon communication of the image data through Internet. The data converted into the data description or added the data description by the description form generating means in the image communicating apparatus is transferred to the personal computer, which is the terminal apparatus, through the standardized bidirectional parallel peripheral interface, then outputted to the Internet.

Standard of the bidirectional parallel peripheral interface for the personal computer conforms IEEE1284. As a description language used in the Internet, there are VRML, Hotjave and the like other than HTML. It is assumed in this invention that HTTP is used as an upper communication protocol.

The image communicating apparatus of this invention may automatically make a model of an HTML document structure inside the facsimile apparatus such that image data read out by the image reading means is adapted to the HTML data description, thereby coping with both a case where the image data of information of the original is treated as a GIF (Graphical Image File) and described in HTML, and a case where the image data is defined in TIFF (Tag Image File Format). In TIFF, attribute information about data is defined in order to keep compatibility of the data between apparatus. In TIFF, information is defined with a tag name and numerical values (Tag defines the number of mains-canning lines, the number of sub-scanning lines, monochromatic, and so on, for example). In the image communicating apparatus, it is therefore possible to select and designate either or both a case where image data read out by the image reading unit is treated as a GIF in HTML document description or/and a case where the image data is treated as TIFF file in the HTML document description to process the image data in (a) selected/designated manner(s). A difference between them is that the GIF is simple image data, whereas TIFF file is data having been undergone data compression (MH, MR, or the like) in the facsimile apparatus to which definition information (the number of main-scanning lines, the number of sub-scanning lines, a compression method, etc.) is added to keep compatibility of data between apparatus.

In the case of WWW in Internet, data is described in HTML so that an image communicating apparatus such as a facsimile apparatus or the like uses an image information tag <img src==/XXXXX.gif> or <img scr==XXXXX.tiff> described in image data and HTML to indicate whether data is a bit data file or data having been undergone a process such as compression or the like. HTML description in which image information is described may be automatically generated with a model of HTML. The facsimile apparatus can convert an original into data which can be treated in the Internet by virtue of the above function so as to readily provide a hand-written document as Internet data. In the facsimile apparatus, text data described in HTML by virtue of the above function is stored in an internal storage of the facsimile apparatus.

The facsimile apparatus transfers data in the storage to a storage of a personal computer or the like through a bidirectional parallel peripheral interface. This interface conforms to IEEE1248. The personal computer or the like outputs a document file generated by the above function to Internet or stores it in a WWW server to provide it for retrieval by clients. The document file (a data file) described in a HTML document structure may be displayed on a display using a viewer equipped to the terminal apparatus so that the client may display information generated by the facsimile apparatus on the display with a HTML viewer equipped to the individual personal computer or the like. The viewer according to this invention requires a viewer software which can interpret definition information in GIF or TIFF in the HTML document structure. As a viewer, incorporated in an apparatus of the client currently usable in the Internet, Mosaic, Netscape and the like are standard as HTML viewers (browser softwares).

According to this invention, it is possible to readily generate data (Internet data). If a floppy disk is employed as an output mode, an interface may be omitted so that anyone can readily make a document data in HTML description, and output data to the Internet only by selecting a file in a personal computer or the like. A document file defined and processed as a TIFF file is added attribute information thereto in order to keep compatibility of data between terminal apparatus so that the data may be used in different apparatus.

According to this invention, it is possible to readily connect the communicating apparatus to the Internet, and largely increase a range of destinations of communication, as above.

Figure 1:
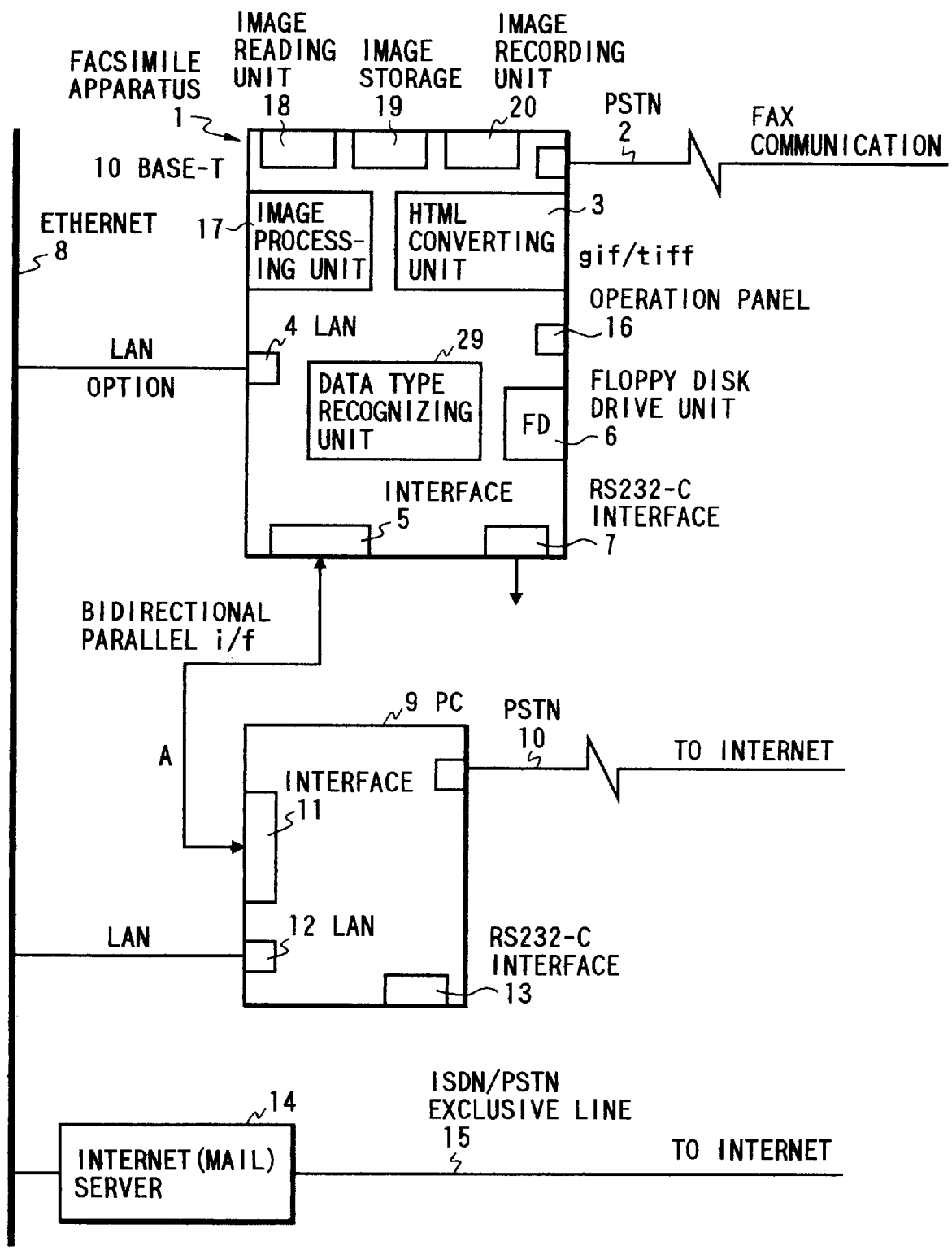
FIG. 1 is a block diagram showing an image communicating apparatus including a facsimile apparatus according to a first and a second embodiments of this invention.

DETAILED DESCRIPTION OF THE INVENTION (1) Description of Aspects of the invention As a first aspect of this invention, an image communicating apparatus of this invention includes an image reading means for reading an original document. A data inputting means inputs various direction data and an image storage means for storing received data or data that should be transmitted. An image recording means prints out the image data stored in the image storage. A communication controlling means controls an operation to exchange data over a communication line and a description form generating means generats a data description form which can be treated in the Internet. An outputting means relates the data description form generated by the description form generating means to the image data stored in the image storage to output them to Internet, thereby sending out the data from a facsimile apparatus to the Internet.

The above image communicating apparatus recognizes whether data to be treated is in a bit form or in a compressed form, defines a data description form for processing image data if the data is in the bit form, whereas defining a data description form in which the compressed form can be set if the data is in the compressed form, thereby generating a data description form suitable for a mode of transmit data which can be treated in the Internet.

The above image communicating apparatus may define a data description form using an appropriate extension according to data to be treated.

The above image communicating apparatus may add a file name to information relating to a data description form, generated by the description form generating means and image data, to thereby readily manage a file of transmit data.

As a second aspect of this invention, an image communicating apparatus has an image reading means for reading an original document to obtain image data. A receiving means receires data by a facsimile from another facsimile over a telephone line, and a data type recognizing means recognizes whether the data is the image data obtained by the image reading means or the data received from another facsimile over the telephone line. An adding means for adding a data description form which can be treated in the Internet if the data type recognizing means judges that the data is obtained by the image reading means, or adding a data description form which can be treated in the Internet while keeping a received form of the data if the data type recognizing means judges that the data is received over the telephone line. An outputting means outputs data to which the data description form has been added by the adding means to the Internet, thereby sending out the data received by the facsimile from another facsimile to the Internet.

The image communicating apparatus described in the first or second aspect may include an OCR (Optical Character Recognition) recognizing means for recognizing OCR data, and an Internet address generating means for generating an address of a destination in the Internet on the basis of a result of the recognition by the OCR recognizing means, thereby transmitting data to the Internet in an easy operation.

As a third aspect of this invention, a method for outputting data from a facsimile apparatus used in the image communicating apparatus with the above structure comprises the steps of adding a data description form adapted to the Internet, to image data obtained over the telephone line, or by the image reading means in the facsimile apparatus. Information of the image data to which the data description form has been added is transferred to a personal computer connected to the facsimile apparatus through bidirectional parallel peripheral interfaces. The information is provided from the personal computer to the Internet, thereby outputting the data from the facsimile apparatus to the Internet in a simple manner.

In the above method for outputting data from a facsimile apparatus used in the image communicating apparatus, an address of a destination in Internet is recognized by the OCR unit when an original is read out so that the data is automatically outputted to the Internet based on a result of the recognition, thereby outputting the data in a simple manner.

In the above method for outputting data from a facsimile apparatus used in the image communicating apparatus, an address of the a destination of Internet is recognized from data received from another facsimile, and data is automatically outputted to the Internet based on a result of the recognition so that the data can be outputted from the facsimile apparatus to the Internet in a simple manner.

(2) Description of Preferred Embodiments
(a) Description of a First Embodiment

Now, description will be made of a first embodiment of the present invention referring to the drawings. FIG. 1 is a block diagram showing a facsimile apparatus with an HTML description function as an example of an image communicating apparatus according to the first embodiment of this invention. In FIG. 1, reference numeral 1 denotes a body of the facsimile apparatus which is an example of the image communicating apparatus of this embodiment, and 2 denotes a communication line connected to the facsimile apparatus 1, to which PSTN (Public Switched Telephone Network) is connected in this embodiment. 3 denotes an HTML converting unit for converting image data of the facsimile apparatus 1 such that the image data can be adapted to an HTML description, and 4 denotes a LAN (Local Area Network) unit for connecting the facsimile apparatus 1 to LAN. 5 denotes an interface as the communication controlling means through which the facsimile apparatus 1 exchanges data with an external terminal apparatus such as a personal computer. 6 denotes a floppy disk drive unit for writing data generated by the facsimile apparatus 1 into a floppy disk, and 7 denotes an interface provided aside from the above interface 5 through which the facsimile apparatus 1 exchanges data with a personal computer or the like. Reference numeral 8 denotes Ethernet which is a communication network configured for data communication between personal computers. Reference numeral 9 denotes a personal computer which is connected to the Ethernet 8 besides exchanging data with the facsimile apparatus 1. 10 denotes a communication line connected to the personal computer 9, to which PSTN is connected in this embodiment.

Reference numeral 11 denotes an interface through which the personal computer 9 exchanges data with the facsimile apparatus 1, 12 denotes a LAN unit for connecting the personal computer 9 to the LAN, and 13 denotes an interface through which the personal computer 9 exchanges data with another terminal apparatus. Reference numeral 14 denotes an Internet server connected to Ethernet 8 to be connectable to the Internet, and 15 denotes an ISDN (Integrated Services Digital Network)/PSTN (Public Switched Telephone Network) exclusive line connected to the Internet server 14. Reference numeral 16 denotes an operation panel as the data inputting means through which various operations are selected and designated in the facsimile apparatus 1, 17 denotes an image processing unit for conducting processes such as designated data compression/conversion and the like, 18 denotes an image reading unit for reading an original to generate image data, 19 denotes an image storage for temporarily storing image data obtained by reading out an original and inputted by the image reading unit 18, and 20 denotes an image recording unit for outputting the image data stored in the image storage 19 as a hard copy.

According to this embodiment, software relating to the LAN are incorporated in the LAN units 4 and 12, respectively. In this embodiment, various interfaces are used. These interfaces have a function as the communication controlling means between the facsimile apparatus 1 and a line or a communication line to which the facsimile apparatus 1 is connected. As the interfaces 5 and 11, bidirectional parallel data interfaces are used to directly exchange data between the facsimile apparatus 1 and the personal computer 9. The interfaces 7 and 13 are input-output interfaces for serial data. RS232-C is adaptable as the interfaces 7 and 13. For the Ethernet 8, 10BASE10 standardized in the Ethernet standard is used, for example.

As the ISND/PSTN exclusive line 15 connected to the Internet server 14, an ISND line used to connect to an Internet provider is employed in this embodiment, for example.

Figure 2:
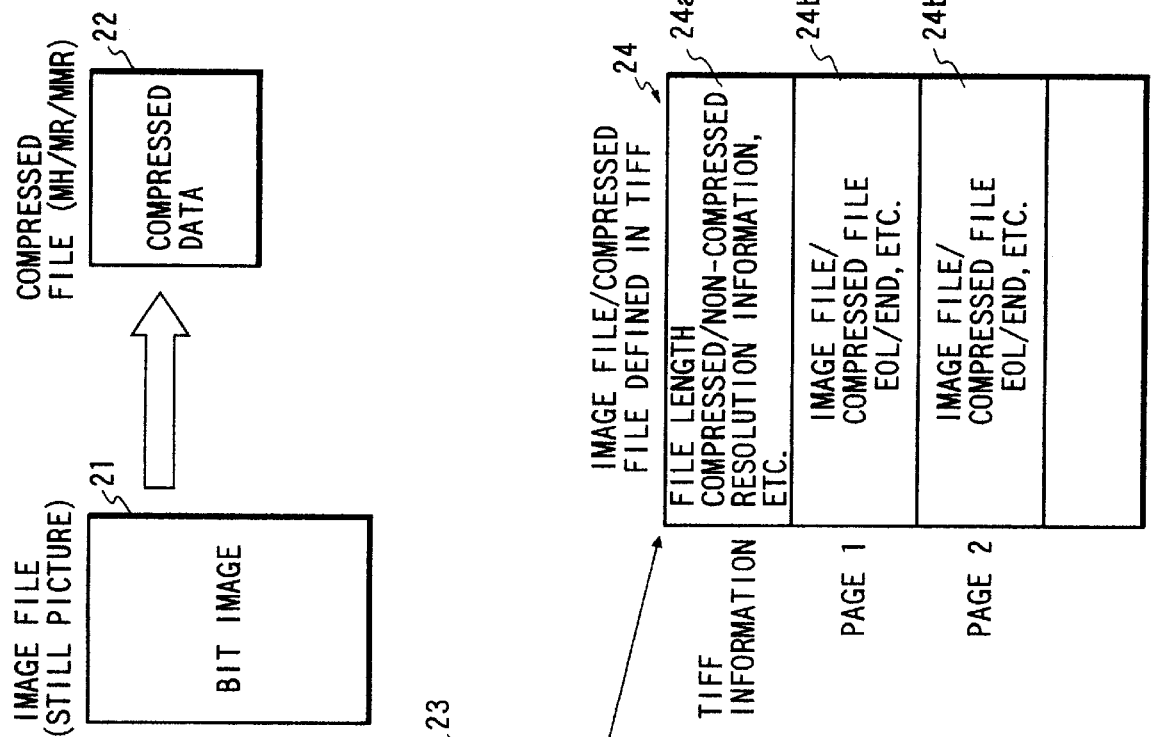
FIG. 2 shows an example of a format of data in a file form obtained by reading an original by the facsimile apparatus according to the first embodiment.

FIG. 2 illustrates a file form of data having been read by the image reading unit 18 of the facsimile apparatus 1. Image data of a still picture read out and inputted by the image data reading unit 18 is bit map image composed of binary data, which is generated as a file as it is and becomes an image file 21 as shown in FIG. 2. If compressed in a system such as MH, MR, MMR or the like by the image processing unit 17, the above bit map image is converted into compressed data, generated as a file in a compressed form, and becomes a compressed file 22. The above image file 21 and the compressed file 22 are stored in the image storage 19.

Figure 3:
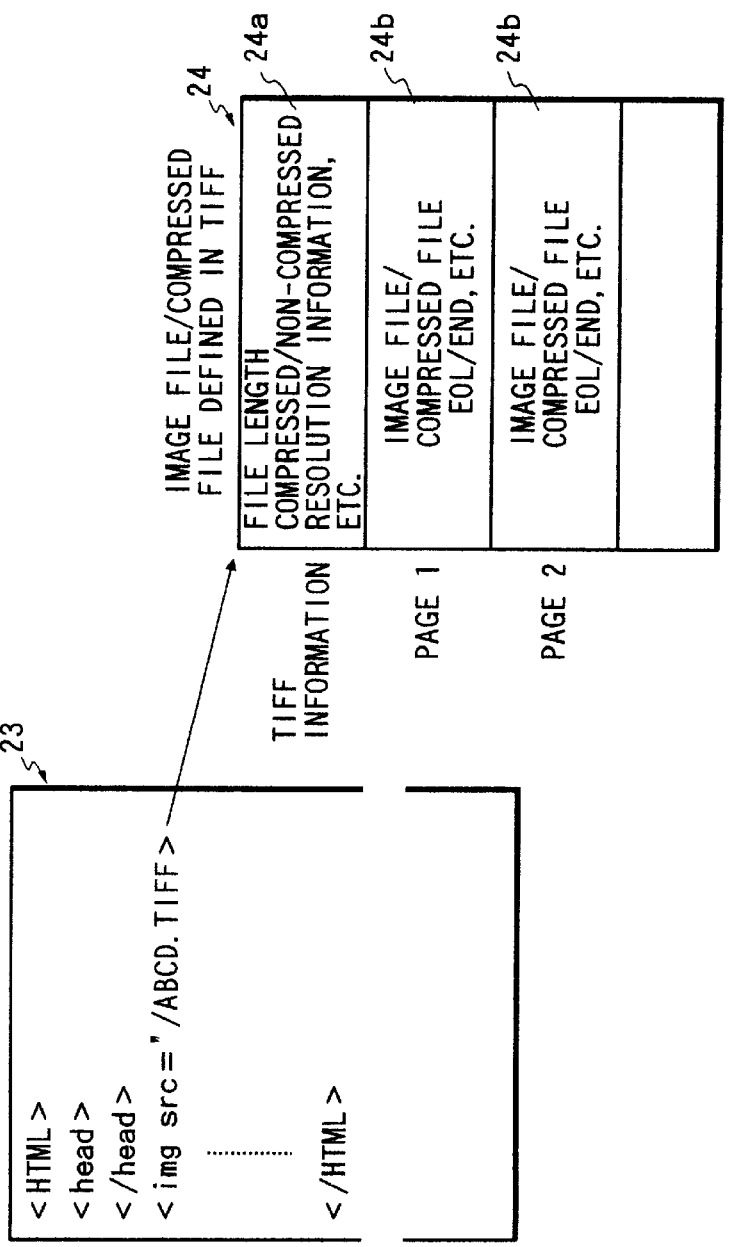
FIG. 3 shows an example of a format of data in a file form generated by an HTML converting unit of the facsimile apparatus and defined in TIFF according to the first embodiment.

FIG. 3 illustrates a data file generated by the HTML converting unit 3 of the facsimile apparatus 1. This generated data is data having been undergone a process such as compression or the like. In HTML description data, information defining contents of the process is shown in TIFF.

Although a method of the above data process depends on an application, MH, MR, MMR or the like is used in an image processing for documents, JPEG (Joint Photographic Expert Group) is used for still pictures, and MPEG (Moving Picture Expert Group) is used for moving pictures, for instance. In FIG. 3, reference numeral 23 shows an HTML document description structure obtained by defining the image file 21 in TIFF and forming it into a text in a form adaptable to HTML document description. Reference numeral 24 illustrates the TIFF defined file generated by defining the image file 21 or the compressed file 22 in TIFF, which includes index information region 24a in which data such as a file length, compression/non-compression indication information, resolution information and the like is stored, and a file region 24b in which the image file or the compressed file which is an actual file is stored.

Figure 4:
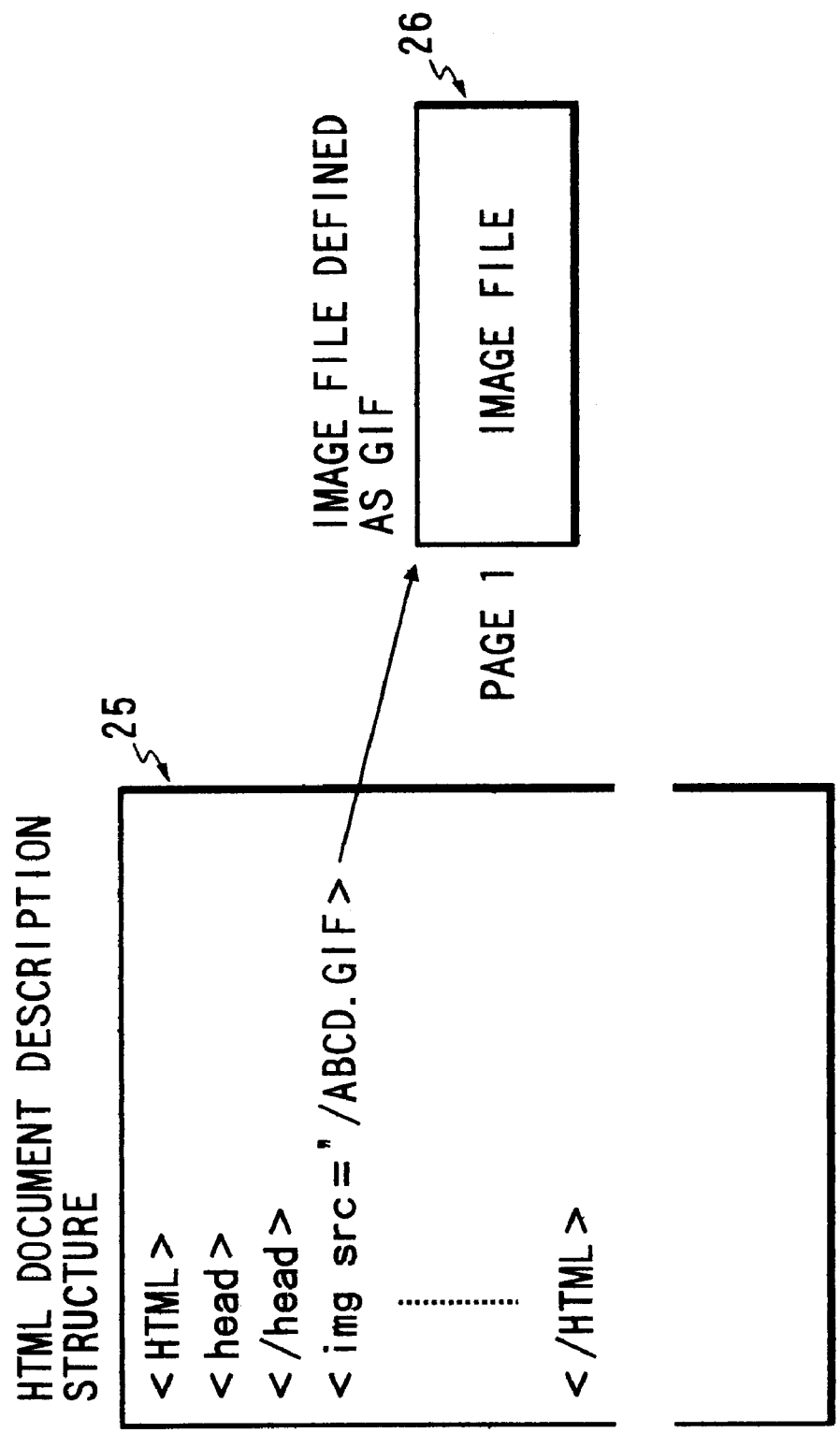
FIG. 4 shows an example of a format of data in a file form generated by the HTML converting unit of the facsimile apparatus according to the first embodiment and defined as a GIF.

FIG. 4 illustrates a generated data file different from one shown in FIG. 3, which is generated by the HTML converting unit 3 of the facsimile apparatus 1. Generated file shown in FIG. 4 has not undergone the data process such as compression or the like, to which the image file defined as GIF is added. In FIG. 4, reference numeral 25 shows an HTML document description structure obtained by defining the image file 21 as GIF and forming it into a text adaptable to HTML document description. Reference numeral 26 illustrates the image file defined as GIF.

Figure 5:
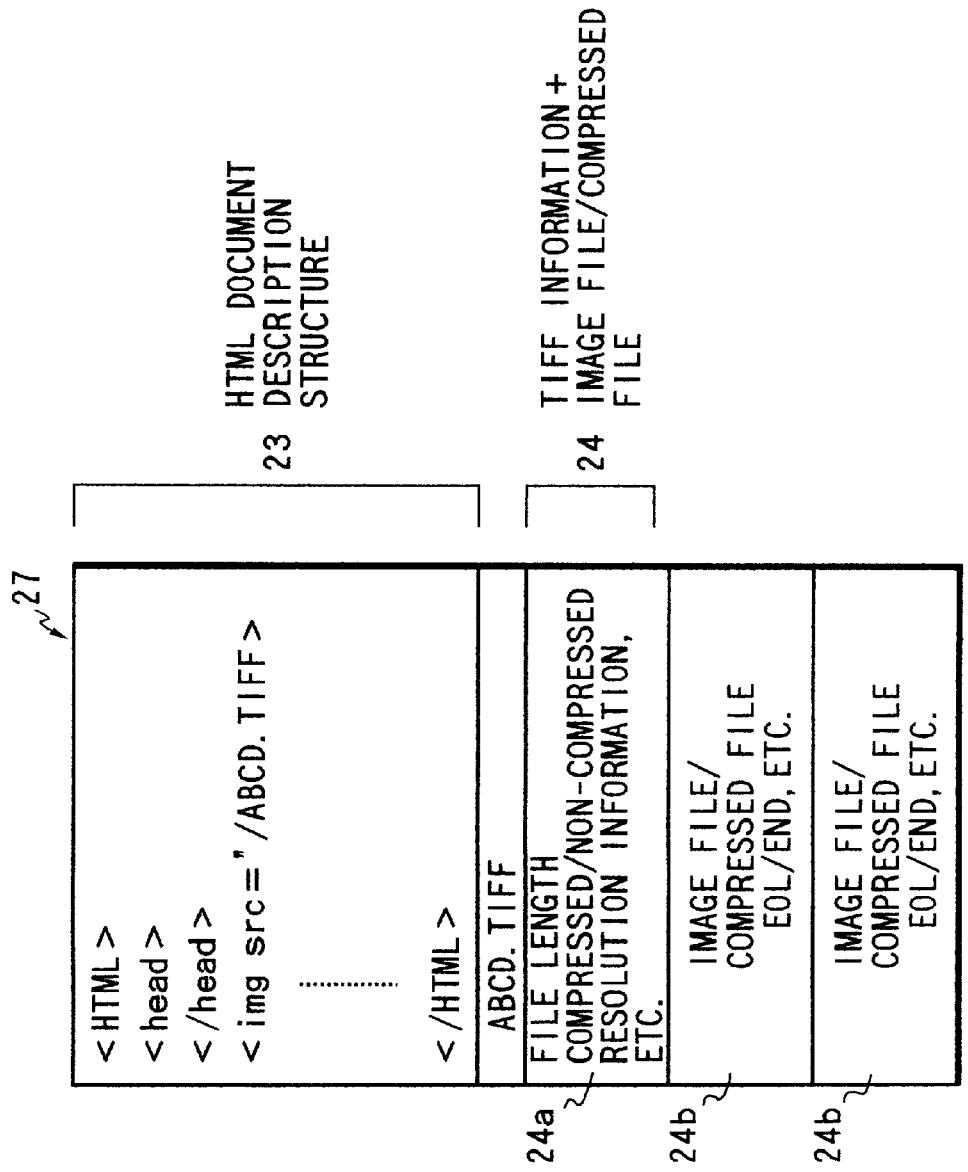
FIG. 5 shows an example of a format of synthesized data file consisting of the data file form generated by the HTML converting unit of the facsimile apparatus according to the first embodiment and defined in TIFF and image data that should be transmitted.

FIG. 5 shows a concept of a synthesized data file, which illustrates how the image file 21 of the facsimile is expressed in HTML description. In FIG. 5, a synthesized data file 27 is defined in TIFF. The synthesized data file 27 is composed of the HTML document description structure 23 and the TIFF defined file 24.

Figure 6:
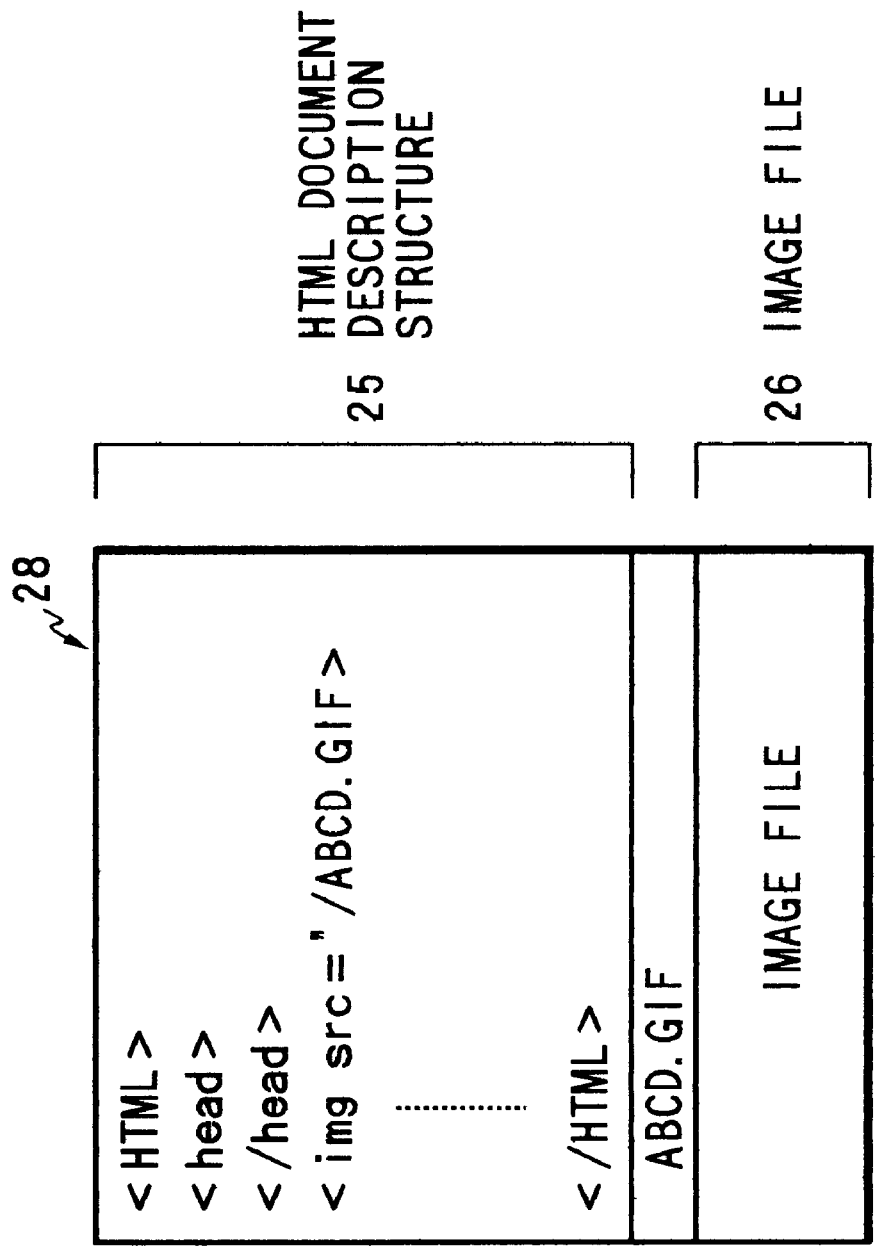
FIG. 6 shows an example of a synthesized data file consisting of the data file generated by the HTML converting unit of the facsimile apparatus according to the first embodiment and defined as GIF and image data that should be transmitted.

FIG. 6 shows a concept of a synthesized data file, which illustrates how the image file 21 of the facsimile is expressed in HTML description. FIG. 6 shows a synthesized data file 28 defined as GIF. In FIG. 6, the synthesized data file 28 is composed of the HTML document description structure 25 and the image filed 26 is defined as GIF.

Figure 7:
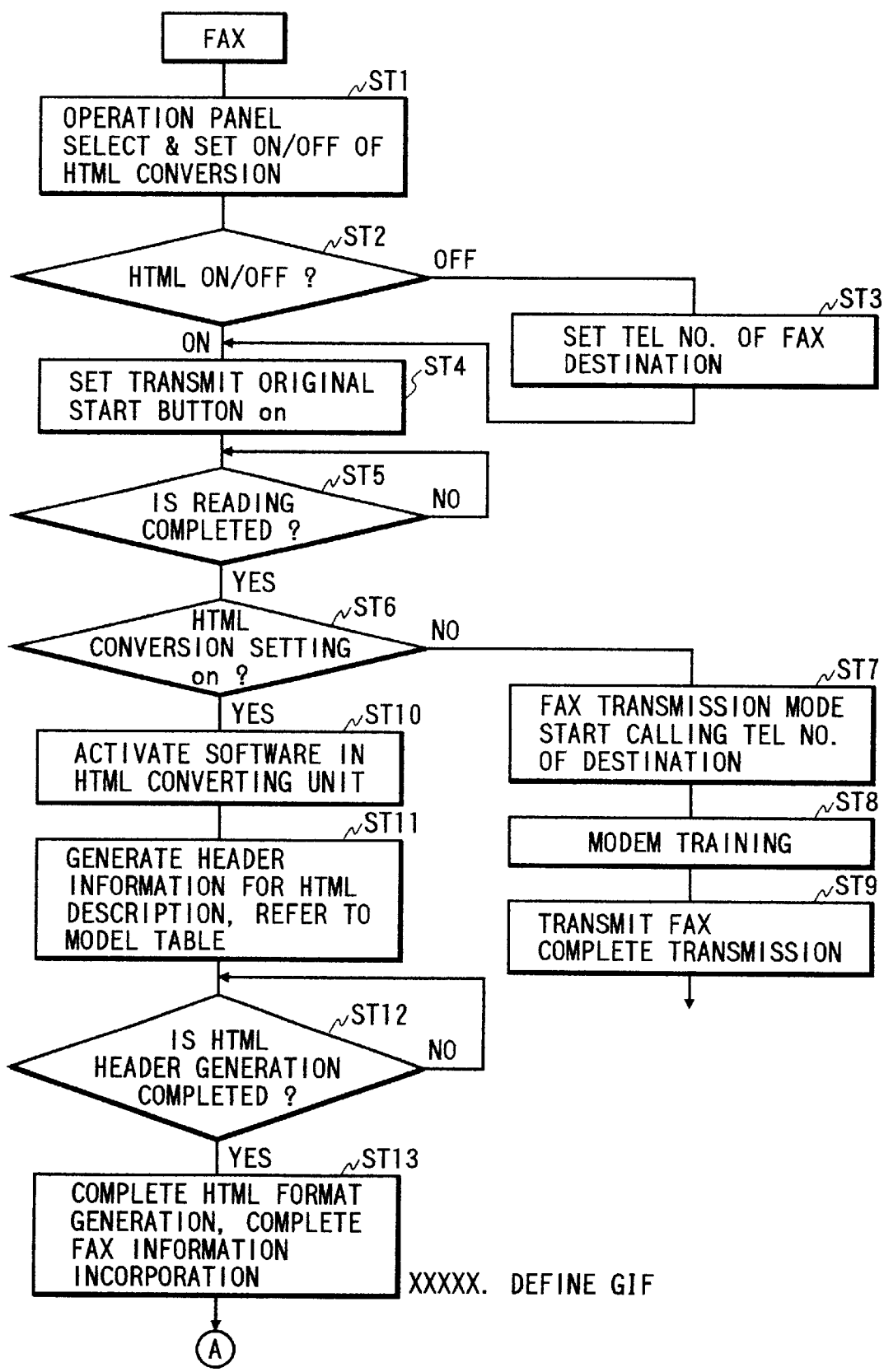
FIGS. 7 and 8 are flowcharts for illustrating an operation of the facsimile apparatus to read an original and send it to Internet according to the first embodiment.
Figure 8:
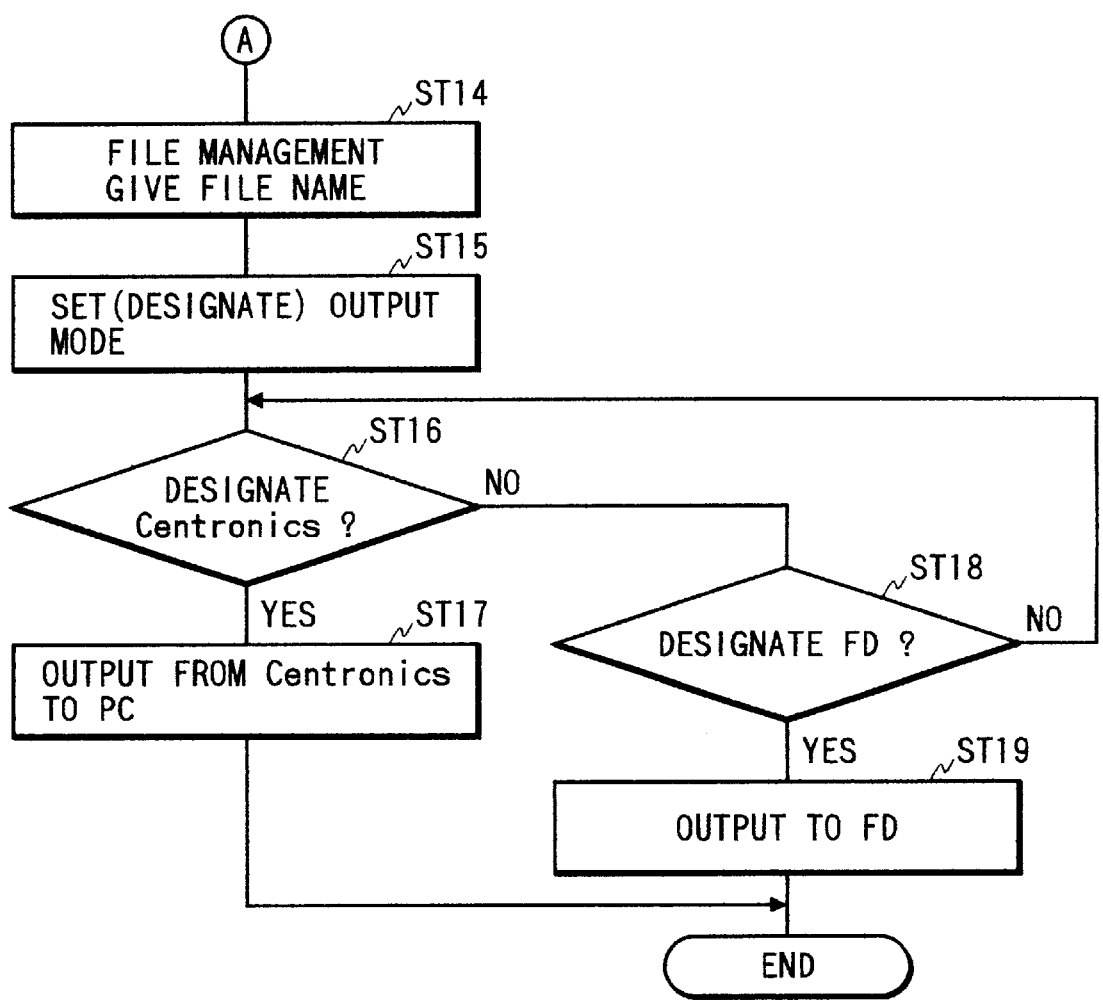

Next the description will be of an operation of the facsimile apparatus 1 with the above arrangement. FIGS. 7 and 8 are flowcharts for illustrating an outputting operation of the facsimile apparatus 1 according to this embodiment to read an original document, and transmit data to another facsimile apparatus, or transmit it to the Internet. At the start of the operation of the facsimile apparatus 1, a direction is inputted through the operation panel 16 to select whether an operation of the HTML converting unit 3 is ON (Internet communication) or OFF (normal facsimile transmission) and set the selected mode at a process step (hereinafter, simply called a step) ST1. In this selecting-setting process, it is also selected whether the image data read out is compressed or the image data is not compressed and transmitted as it is. At the next Step ST2, it is checked whether the HTML converting unit 3 is ON or OFF. If the HTML converting unit 3 is set to OFF, it means that normal facsimile transmission is selected so that a telephone number of a destination of the facsimile transmission is set (or inputted to be accept), then the procedure proceeds to a process at Step ST4.

If it is judged at step ST2 that the HTML converting unit 3 is set to ON, it means that the Internet communication is selected so that the procedure proceeds to a process at Step ST4 without setting a telephone number of the destination of the facsimile transmission. At Step ST4, a transmit original is set in the image reading unit 18 and a start button (a switch) on the operation panel is pushed down (or turned ON), whereby the original is read out and image data read out is stored in the image storage 19. If it is set in the original reading operation that the read image data is to be compressed, the image processing unit 17 compresses or converts the data. As a system to compress or onvert the data, MH, MR, MMR, JPEG or the like is employed. During execution of the operation to read the original, it is checked at Step ST5 whether the reading of the original is completed or not. If the operation is not completed, the check is repeated until the reading is completed. If the reading of the original is completed, it is once more checked at Step ST6 whether the HTML converting unit 3 is set to ON or OFF. If the HTML converting unit 3 is set to OFF, the facsimile apparatus 1 is switched to a facsimile transmission mode and the telephone number of the destination of the facsimile communication is called. At Step ST8, processes such as confirmation of the destination facsimile, modem training and the like are conducted. After that, the facsimile transmission is conducted at Step ST9 so that the image data is transmitted. When the transmission of the image data is completed, the transmission operation is completed through a predetermined confirming process.

If it is judged at Step ST6 that the HTML converting unit 3 is set to ON, the HTML converting unit 3 is activated at Step ST10. At Step ST11, the HTML converting unit 3 generates header information used for HTML description, whereby the HTML document description structure 23 or 25 described before with reference to FIGS. 3 and 4 is generated. In this case, it is possible to provide a model of a table used to generate the header information in the facsimile apparatus 1 to generate the header information referring to the model of the table. At Step ST12, it is checked whether generation of the header information used for HTML description is completed or not. If the generation of the header information is not completed, the check is repeated. If it is judged at Step ST12 that the generation of the header information is completed, the procedure proceeds to Step ST13 at which generation of an HTML format is completed and facsimile information is incorporated in the HTML format. The synthesized data file 27 described before with reference to FIG. 5 composed of the HTML document description structure 23 and the image file 24 defined in TIFF or the synthesized data file 28, described before with reference to FIG. 6, composed of the HTML document description structure 25 and the image file 26 defined as GIF is generated. The data is formed into a text in a document description adapted to HTML description, and the compressed or non-compressed data is stored in a file form in the image storage 19.

At Step T14, file management is conducted to give a file name, for instance. A name is given to the file by inputting a file name through the operation panel 16. At Step ST15, the interface 5 is designated and an operation of the interface 5 is set as a process to set an output mode. At Step ST16, it is checked whether the interface 5 is designated and the operation of the interface 6 is set or not. If the interface 5 is designated and the operation of the interface 6 is set, transmit data in the HTML description form is transferred from the facsimile apparatus 1 to the personal computer 9 through the interface 5 and the interface 11 both of which are bidirectional parallel peripheral data interfaces. The transmit data transferred to the personal computer 9 is then sent out to the Internet. Connection to the Internet is established by an Internet connecting software incorporated in the personal computer 9. Mosaic or Netscape is employed as a browser which is the Internet connecting software. Data generated by virtue of a function of the above software is used as WWW server data or data that is to be retrieved by clients, which can be seen on a screen using a browser software.

If it is judged at Step ST16 that the interface 5 is not designated and the operation of the interface 5 is not set, it is checked at Step ST18 whether a floppy disk is designated or not in order to store the data in the HTML description form in an external storage medium. If the floppy disk is not designated, the procedure returns to the checking process at Step ST16. If it is judged at Step 18 that the floppy disk is designated, the floppy disk drive unit 6 is operated at Step ST19 so that the data is written into the floppy disk.

(b) Description of a Second Embodiment

As having been described the first embodiment of this invention where an original document is read by the facsimile apparatus 1 to obtain image data and the image data read is send out to Internet, a description will be now made of a second embodiment of this invention where an original is not read by the facsimile apparatus 1 but data obtained over a communication line such as a telephone line or the like is converted into an HTML document description structure and sent out to the Internet.

Figure 9:
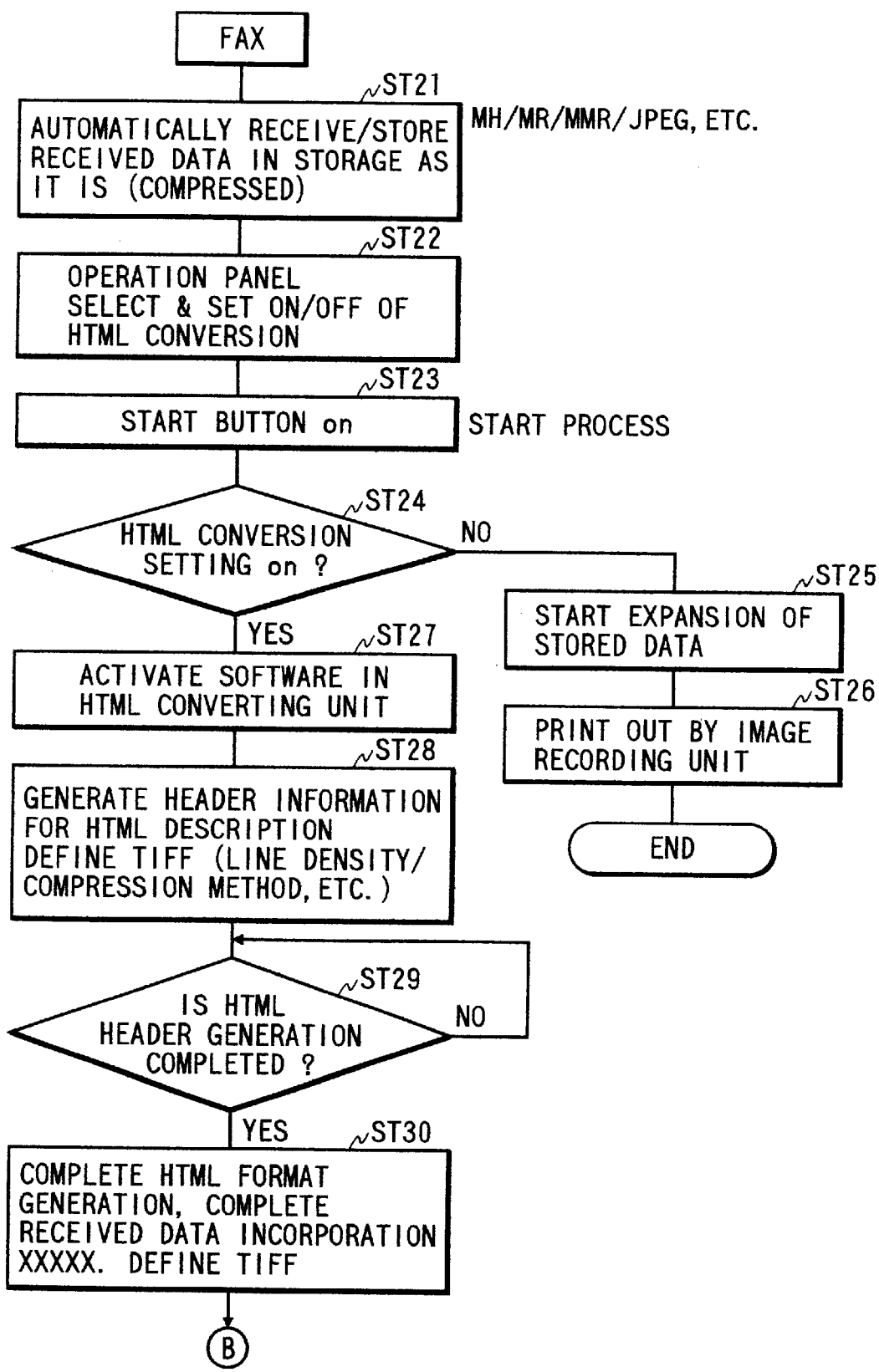
FIGS. 9 and 10 are flowcharts for illustrating an operation of the facsimile apparatus to send data received from another facsimile apparatus to Internet according to a second embodiment of this invention.
Figure 10:
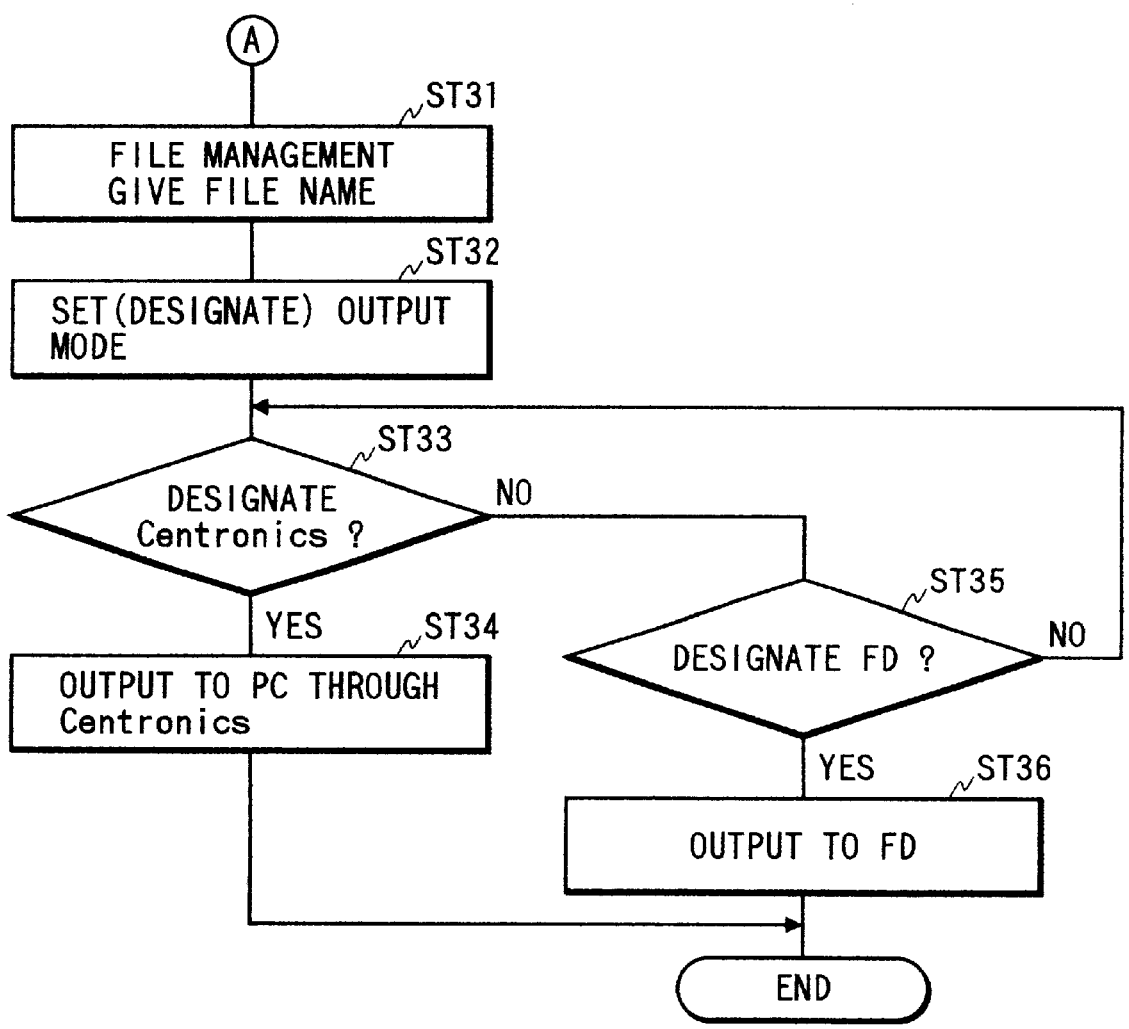

FIGS. 9 and 10 are flowcharts for illustrating an operation of the facsimile apparatus 1 according to the second embodiment to receive data (image data or the like) from another facsimile apparatus and send out the received data to the Internet. In the operation, the facsimile apparatus 1 automatically receives data at Step ST21. Data on the telephone line is analog signals so that the facsimile apparatus 1 decodes the data by a coding/decoding apparatus (a modem) when the facsimile 1 receives the data to obtain digital signals so as to regenerate the data. The received data is then stored in the image storage 19. The received data is, in general, data having been compressed. If the received data is compressed data, the data is stored as it is in the image storage 19. As a compression system, MH, MR, MMR, JPEG and the like are employable similarly to the above first embodiment. The received data has been compressed on the transmitting side so that the data is not expanded (decoded) on the receiving side but is stored as it is in the image storage 19, whereby the operation to compress image data obtained by reading the original as done in the first embodiment may be omitted.

At Step ST22, it is selected whether the HTML converting unit 3 is turned ON (the Internet communication) or OFF (the normal facsimile transmission) by inputting a direction through the operation panel 1 and a selected mode is set. In this selecting and setting process, whether the received image data is compressed, or not compressed and transmitted as it is is also set. At Step ST23, the start button (the switch) on the operation panel 16 is pushed down (turned on). At Step ST24, it is checked once more whether the HTML converting unit 3 is set to ON or not. If the HTML converting unit 3 is not set to ON, it is recognized that the received data is not sent out to Internet so that a remaining process of the facsimile receiving operation is conducted. For this, the image processing unit 17 is activated at Step ST25 to read out the received data stored in the image storage 19, then the data is expanded. At Step ST26, the image recording unit 20 is activated to output the received data in a form of a hard copy, whereby a sequence of the facsimile receiving operation is completed.

On the other hand, if it is judged at Step ST24 that the HTML converting unit 3 is set to ON, it is recognized that the received data should be sent out to the Internet and an Internet communicating operation is conducted. In consequence, the HTML converting unit 3 is activated at Step ST27, then the HTML converting unit 3 generates header information used for HTML description at Step ST28. In this case, a model of a table used to generate the header information may be provided in the facsimile apparatus 1 to generate the header information referring to the model of the table. The transmit data is so defined as to be information in TIFF. As a result, the HTML document description structure 23 as shown in FIG. 3 is generated. Information such as a line density, a compression method, the number of pages and the like is defined and added as TIFF information. At Step ST29, it is checked whether generation of the header information used for HTML description is completed or not. If the generation of the header information is not completed, the check is repeated. If it is judged that the generation of the header information is completed, the process to generate the HTML format is completed at Step ST30, besides the facsimile information, that is, the above received data, is incorporated in the HTML format. The synthesized data file 27 as shown in FIG. 5 composed of the HTML document description structure 23 and the image file 24 defined in TIFF is thereby generated. The data is thereby formed into a text in a document description adapted to HTML description, and the compressed data is stored in the image storage 19.

At Step ST31, file management is conducted to give a file name, for instance. A name is given to a file by inputting a file name through the operation panel 16. At Step ST32, designation of the interface 5 and setting of an operation of the interface 5 is done as a process to set an output mode. At Step ST33, it is checked whether the interface 5 is designated and the operation of the interface 5 is set or not. If the designation of the interface 5 and setting of the operation of the interface 5 are completed, transmit data in the HTML description form is transferred from the facsimile apparatus 1 to the personal computer 9 through the interface 5 and the interface 11 both of which are bidirectional parallel peripheral interfaces at Step ST34. The transmit data transferred to the personal computer 9 is send out to Internet. Connection to Internet is established by an Internet connecting software incorporated in the personal computer 9. Mosaic or Netscape is employable as a browser which is the Internet connecting software. Data generated by virtue of a function of such a software is used as WWW server data or data that is to be retrieved by clients, which can be seen on a screen by using a browser software.

If it is judged at Step ST33 that the interface 5 is not designated and the operation of the interface 5 is not set, it is judged at Step ST35 whether a floppy disk is designated or not in order to store the data in the HTML description form in an external storage medium. If the floppy disk is not designated, the procedure returns to the checking process at Step ST33. If it is judged at Step ST35 that the floppy disk is designated, the floppy disk drive unit 6 is operated so that the data is written in the floppy disk.

According to the second embodiment, data received from a facsimile apparatus installed in a remote place may be processed by the facsimile apparatus 1 of this invention so as to be usable as transmit data of this invention for Internet communication. Further, the data received from a facsimile (a single function type) without an interface for directly connecting to a personal computer or the like installed in a remote place may be processed in the manner according to this invention so as to be transmitted to the Internet. The facsimile apparatus 1 of this invention is connected to the personal computer 9 through the bidirectional parallel interfaces 5 and 11 so that it is possible to use the facsimile apparatus 1 as a printer for the personal computer 9. Therefore, received data transmitted to the personal computer 9 through the Internet may be displayed on a screen using an Internet connecting software such as Mosaic, Netscape or the like, and only necessary information may be printed out by the facsimile apparatus 1.

As a modification of the second embodiment, it is possible to provide a data type recognizing unit 29 (refer to FIG. 1) as a means for recognizing a type of data to recognize whether data that should be transmitted is data read out and inputted by the image reading unit 18 or data received from another facsimile apparatus over the telephone line 2. As a result of the recognition by the data type recognizing unit 29, if it is judged that data that should be transmitted is data fed from the image reading unit 18, a data description form which can be treated on the Internet may be added to the data and outputted to the Internet through the personal computer 9 as described before in the first embodiment. If the data that should be transmitted is data received from another facsimile over the telephone line 2, a data description form in which a mode of receiving data can be set may be added to the data, and outputted to the Internet through the personal computer 9 as described in the second embodiment.

In the above case, it is also possible to recognize an address of a destination in Internet from the data received from another facsimile and automatically output the data to Internet based on a result of the recognition.

(c) Description of a Third Embodiment

Figure 11:
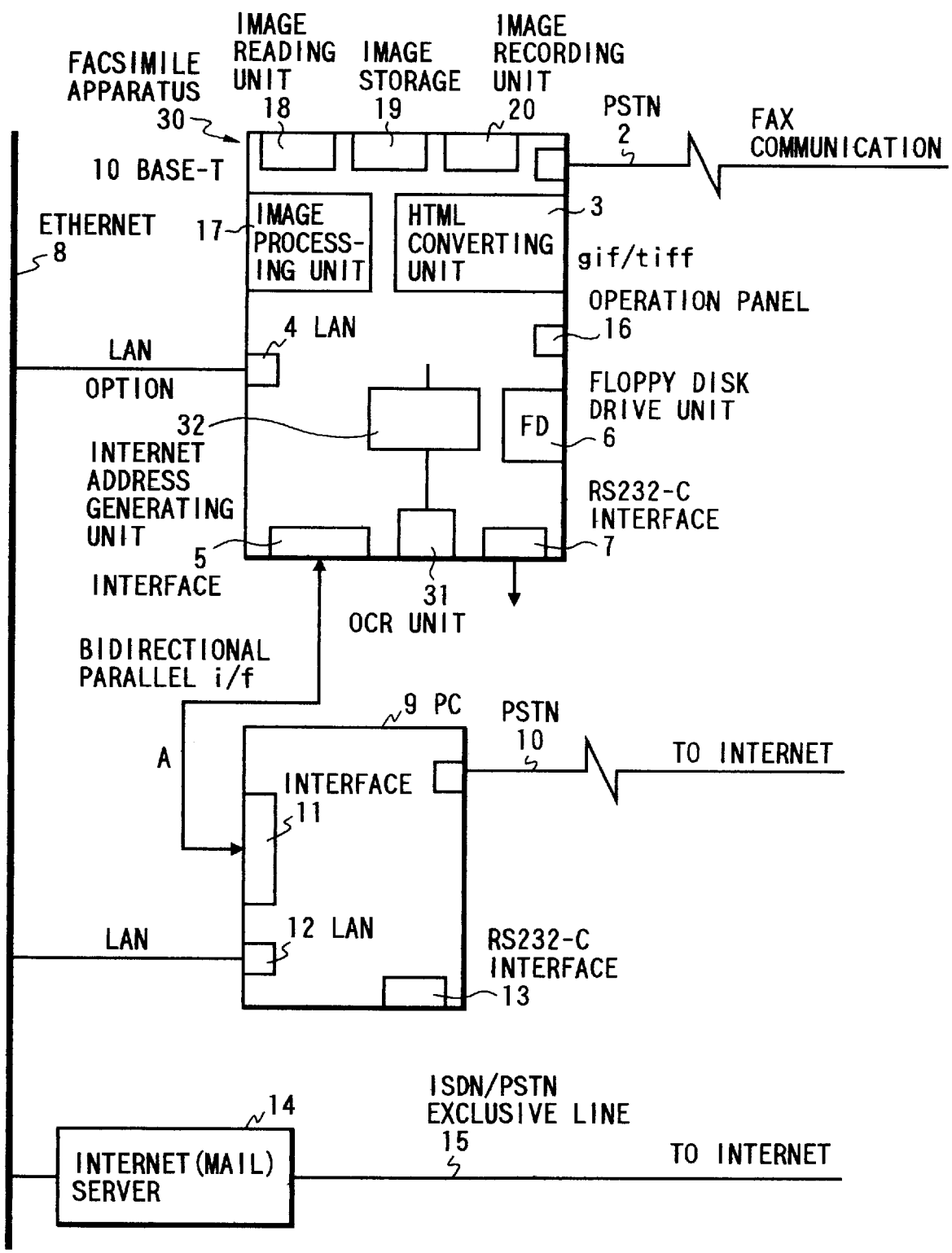
FIG. 11 is a block diagram showing an image communicating apparatus according to a third embodiment of this invention.

Next, description will be made of a third embodiment of this invention referring to the drawing. FIG. 11 is a block diagram showing a facsimile apparatus with an HTML description function according to the third embodiment of this invention. In FIG. 11, reference numeral 30 denotes a body of the facsimile apparatus according to the third embodiment. The facsimile apparatus 30 has a structure similar to that of the facsimile apparatus 1 according to the first and second embodiments. The facsimile apparatus 30 has function units necessary for facsimile communication such as an operation panel 16, an image processing unit 17, an image reading unit 18, an image storage 19, an image recording unit 20, and the like, along with an HTML converting unit 3 that is a future of this invention. The facsimile apparatus 30 is connected to a personal computer 9 through bidirectional parallel peripheral interfaces 5 and 11. The personal computer 9 is connected to Internet over a communication line 10. The facsimile apparatus 30 according to this embodiment includes, in addition to the above structure, an OCR unit 31 for reading an OCR sheet to recognize contents of a direction (OCR recognition), and an Internet address generating unit 32 for generating an address used for Internet communication based on a result of the recognition by the OCR unit 31.

In the facsimile apparatus 30 with the above arrangement according to this embodiment, the operator sets an OCR sheet on which necessary items such as an address of a destination in the Internet and the like is set on an original of a document that is intended to be transmit. When the OCR sheet is set, the image reading unit 18 reads the OCR sheet, and the OCR unit 31 recognizes OCR information from data read out and sends a result of the recognition to the Internet address generating unit 32. The Internet address generating unit 32 generates the address of the destination for the Internet communication on the basis of the OCR information.

If the HTML converting unit 3 is set to ON in the facsimile apparatus 30, the HTML converting unit 3 is activated to generate header information for HTML description, whereby the HTML document description structure 23 or 25 described before with reference to FIG. 3 or 4 is generated. When generation of the header information for HTML description is completed, an HTML format is generated with facsimile information, and Internet address information for the destination generated by the Internet address generating unit 32, are incorporated in the HTML format. As a result, the synthesized data file 27 or 28 described before with reference to FIG. 5 or 6 obtained by synthesizing the HTML document description structure 23 or 25, and the image file 24 or 26 defined in TIFF or as GIF is generated, and the document adapted to the HTML description is transferred to the personal computer 9, and then sent out to the Internet.

According to this embodiment, it is possible to employ a method of using an OCR sheet to connect to Internet, putting a feature of this invention into practice. If an address of a destination in the Internet communication frequently communicated is optically read in advance, an operation for the Internet communication may be quickly done, which can omit the trouble of inputting an address of the destination through the keyboard on each occasion.

What is claimed is:

1. An image communicating apparatus comprising:
    an image reading means for reading an original document to obtain data;
    a receiving means for receiving data from a facsimile apparatus over a telephone line;
    a data type recognizing means for recognizing whether data is the data obtained by said image reading means or the data received from the facsimile over the telephone line;
    an adding means for adding a data description form which can be used in Internet communications if said data type recognizing means determines that the data is obtained by said image reading means, and adds a data description form which can be used in Internet communications while maintaining a received form of the data if said data type recognizing means determines that the data is received over the telephone line; and
    an outputting means for outputting the data to which the data description form has been added by said adding means to an Internet connection.

2. An image communicating apparatus comprising:
    an inputting means for inputting image data;
    a recognizing means for determining whether the data inputted by said inputting means is in a bit form or compressed data;
    a data form generating means for generating a data form for processing image data when said recognizing means determines that said data inputted by said inputting means is in the bit form, and a data form that may be set thereto when the data has been determined to be compressed; and
    an outputting means for outputting the data generated by said data form generating means.

3. An image communicating apparatus according to claim 2 wherein said inputting means is an image reading unit for reading an original document.

4. An image communicating apparatus according to claim 2 wherein said inputting means is a receiving unit of a facsimile for receiving data from another facsimile unit.

5. An image communicating apparatus according to claim 2 wherein when said recognizing means determines that the data is in the bit form, said data form generating means generates a TIFF file form.

6. An image communicating apparatus according to claim 2 wherein the data in the TIFF file form includes compressed information.

7. An image communicating apparatus according to claim 2 wherein when said recognizing means determines that the data is in the bit form, said data form generating unit generates a GIF file form.

8. An image communicating apparatus according to claim 2 wherein the data form generated by said data form generating means is an HTML description form.

9. An image communicating apparatus according to claim 2 wherein said outputting means generates data to communicate over an Internet connection.

10. An image communicating apparatus according to claim 2 wherein said outputting means outputs the generated data to a personal computer connected to said image communicating apparatus.

11. An image communicating apparatus according to claim 2 wherein said outputting means provides the generated data to a removable nonvolatile storage unit.

12. An image communicating apparatus according to claim 2 further comprising an OCR unit for recognizing the inputted data in OCR, and an address generating means for generating an address of a destination of a communication on the basis of a result of the recognition by said OCR unit.

13. An image communicating apparatus according to claim 12 further comprising an OCR unit for recognizing the inputted data in OCR, and an address generating means for generating an address of a destination of a communication on the basis of the recognition by said OCR unit.

14. An image communicating apparatus according to claim 2 further comprising a connecting means for connecting said image communicating apparatus to a telephone line, and a LAN unit for connecting said image communicating apparatus to a LAN.

15. An image communicating apparatus comprising:
   an image reading unit for reading an original document;
   a data inputting means for inputting direction data;
   an image storage means for storing received image data and image data to be transmitted;
   an image recording unit for printing out said image data stored in said image storage means;
   a communication controlling means for controlling an operation to transmit/receive data over a communication line;
   a description form generating means for generating a data description form which can be used in Internet communications, said image communicating apparatus determining whether the data to be treated in Internet communication is in a bit form or in a compressed form, and which generates a data description form for processing image data when said data is in the bit form, and generates a data description form which can be attached to the data indicating that the data has been compressed when said data is in the compressed form; and
   an outputting means for relating the data description form generated by said description form generating means to the image data stored in said image storage to communicate over an Internet connection.

16. An image communicating method comprising the steps of:
   an inputting step of inputting data;
   a recognizing step of determining whether said inputted data is in a bit form or in a compressed form;
   a generating step of generating a data form for processing image data when it is determined at said recognizing step that said data is in the bit form, and for generating a data form that can be combined with said data indicating that said data has been compressed when it is determined at said recognizing step that said data is in the compressed form; and
   an outputting step of outputting the generated data.

17. An image communicating method according to claim 16, wherein at said inputting step, said data is inputted from an image reading unit for reading an original document.

18. An image communicating method according to claim 16, wherein at said inputting step, said data is received by a receiving unit of a facsimile unit from another facsimile unit.

19. An image communicating method according to claim 16, wherein at said generating step, the generated data form is an TIF file form when it is determined at said recognizing step that said data is in the compressed form.

20. An image communicating method according to claim 16, wherein at said data form generating step, the generated data form is a GIF file form when it is determined at said recognizing step that said data is in the bit form.

21. An image communicating method according to claim 16, wherein said data form generated at said generating step is an HTML description form.

22. An image communicating method according to claim 16, wherein at said outputting step, the generated data is outputted to communicate over an Internet connection.

23. An image communicating method according to claim 16, wherein at said outputting step, the generated data is outputted to a personal computer.

24. An image communicating method according to claim 16, wherein at said outputting step, the generated data is outputted to an removable nonvolatile storage unit.

25. An image communicating method according to claim 16 further comprising an OCR recognizing step of recognizing said inputted data in OCR, and an address generating step of generating a destination address of a communication on the basis of a result of the OCR recognizing step.

* * * * *